United States Patent
Rasmus et al.

(10) Patent No.: US 10,360,282 B2
(45) Date of Patent: Jul. 23, 2019

(54) METHOD AND APPARATUS FOR EVALUATION OF HYDROCARBON-BEARING RESERVOIRS

(71) Applicant: Schlumberger Technology Corporation, Sugar Land, TX (US)

(72) Inventors: John Rasmus, Richmond, TX (US); Richard E. Lewis, Longmont, CO (US); David Handwerger, Salt Lake City, UT (US); Jack LaVigne, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 709 days.

(21) Appl. No.: 14/975,710

(22) Filed: Dec. 18, 2015

(65) Prior Publication Data

US 2016/0186556 A1 Jun. 30, 2016

Related U.S. Application Data

(60) Provisional application No. 62/098,513, filed on Dec. 31, 2014.

(51) Int. Cl.
*G01V 99/00* (2009.01)
*G06F 17/11* (2006.01)

(52) U.S. Cl.
CPC .............. *G06F 17/11* (2013.01); *G01V 99/00* (2013.01)

(58) Field of Classification Search
CPC .................................. G06F 17/11; G01V 99/00
(Continued)

(56) References Cited

U.S. PATENT DOCUMENTS 2,163,422 A 6/1939 Church
3,849,646 A 11/1974 McKinlay et al.
(Continued)

OTHER PUBLICATIONS

J.O. Amigun et. al., Petrophysical analysis of well logs for reservoir evaluation: A case study of 'Laja' Oil Field, Niger Delta, Journal of Petroleum and Gas Exploration Research (ISSN 2276-6510) vol. 2(10) pp. 181-187, Nov. 2012 (Year: 2012).*
(Continued)

*Primary Examiner* — Rehana Perveen
*Assistant Examiner* — Justin C Mikowski
(74) *Attorney, Agent, or Firm* — Michael Dae

(57) ABSTRACT

A method and system for evaluation of a hydrocarbon-bearing shale formation employs a data processing system that defines a response model that relates first data representing measured petrophysical properties of the shale formation at a given location to second data representing volume fractions for a particular set of formation components at the given location. The first data includes hydrogen index at the given location, and the particular set of formation components of the second data include a number of mineral components and a number of hydrocarbon-bearing components. The hydrocarbon-bearing components include at least one kerogen component. A computation solver processes the response model along with the first data to solve for the second data. The solved second data representing the volume fraction of the at least one kerogen component is processed to derive at least one ratio that is indicative of kerogen maturity at the given location.

15 Claims, 6 Drawing Sheets

(58) Field of Classification Search
USPC .......................................................... 703/2
See application file for complete search history.

(56) References Cited

U.S. PATENT DOCUMENTS

| | | | |
|---|---|---|---|
| 3,947,683 A | 3/1976 | Schultz et al. | |
| 5,440,118 A | 8/1995 | Roscoe | |
| 5,471,057 A | 11/1995 | Herron | |
| 6,571,619 B2 | 6/2003 | Herron et al. | |
| 6,844,729 B2 | 1/2005 | Herron et al. | |
| 2009/0248308 A1 | 10/2009 | Luling | |
| 2009/0254283 A1 | 10/2009 | Jacobi et al. | |
| 2010/0282460 A1* | 11/2010 | Stone | E21B 43/2401 166/248 |
| 2011/0144913 A1 | 6/2011 | Klein et al. | |
| 2013/0199787 A1* | 8/2013 | Dale | E21B 43/26 166/302 |
| 2014/0048694 A1* | 2/2014 | Pomerantz | G01V 11/00 250/255 |
| 2015/0198577 A1* | 7/2015 | Williams | G01N 33/24 250/282 |
| 2016/0139293 A1 | 5/2016 | Misra et al. | |
| 2018/0113088 A1 | 4/2018 | Misra et al. | |
| 2018/0321416 A1* | 11/2018 | Freedman | G01V 3/32 |

OTHER PUBLICATIONS

Ishwar et. al., Petrophysical Well Log Analysis for Hydrocarbon exploration in parts of Assam Arakan Basin, India, Well Logging Services, ONGCL, Assam pp. 1-5 (Year: 2013).*

Sunghwan Kim, et. al., Graphical Method for Analysis of Ultrahigh-Resolution Broadband Mass Spectra of Natural Organic Matter, the Van Krevelen Diagram, Analytical Chemistry, vol. 75, No. 20, pp. 5336-5344, Oct. 15, 2003. (Year: 2003).*

Zhigang Wu, et. al., Two- and Three-Dimensional van Krevelen Diagrams: A Graphical Analysis Complementary to the Kendrick Mass Plot for Sorting Elemental Compositions of Complex Organic Mixtures Based, Analytical Chemistry, vol. 76, No. 9, pp. 2511-2516, May 1, 2004 (Year: 2004).*

Pemper et al., The Direct Measurement of Carbon in Wells Containing Oil and Natural Gas Using a Pulsed Neutron Mineralogy Tool, SPE paper 124234, SPE Annual Technical Conference and Exhibition held in New Orleans, Lousiana, USA, Oct. 4-7, 2009 (14 pages).

Grau, J.A., Schweitzer, J.S., Ellis, D. V., Hertzog, R.C., "A Geological Model for Gamma-Ray Spectroscopy Logging Measurements", Nuclear Geophysics, vol. 3, No. 4, pp. 351-359, 1989.

Harwood, Robert J., "Oil and Gas Generation by Laboratory Pyrolysis of Kerogen," AAPG Bulletin vol. 61, Issue 12. (Dec. 1977), pp. 2082-2102 (1977).

Herron, Michael, Matteson, Abigail, "Elemental Composition and Nuclear Parameters of Some Common Sedimentary Minerals," Nucl Geophysics, vol. 7, No. 3, pp. 383-406, Apr. 28, 1993.

Heubeck, "Geochemistry, Maturation, and Migration", produced for Earth History Class at the Free University Berlin, Department of Geologican Sciences, Aug. 12, 2004 (15 pages).

Seleznev et al., Applications of Dielectric Dispersion Logging to Oil-Shale Reservoirs, SPWLA 52nd Annual Logging Symposium, May 14-18, 2011 (16 pages).

Misra et al., "Complex Electrical Conductivity of Mudrocks and Source-Rock Formations Containing Disseminated Pyrite" Unconventional Resources Technology Conference (URTeC), SPE-178650, San Antonio, Texas, USA, Jul. 20-22, 2015 (15 pages).

Quality of Organic Matter, PA DCNR—Geology—Quality of Organic Matter, Mar. 26, 2012 (2 pages).

Boyer, Producing Gas from its Source, Oilfield Review, Autumn 2006 (14 pages).

Roscoe et al., Use of GSO for Inelastic Gamma-Ray Spectroscopy Measurements in the Borehole, IEEE Transactions on Nuclear Science, vol. 39, No. 5, Oct. 1992, (5 pages).

Barson et al., Spectroscopy: The Key to Rapid, Reliable Petrophysical Answers, Oilfield Review, Summer 2005 (20 pages).

Lewis et al., New Evaluation Techniques for Gas Shale Reservoirs, Reservoir Symposium 2004, (11 pages).

Quirein et al., A Coherent Framework for Developing and Applying Multiple Formation Evaluation Models, SPWLA, 27th Annual Logging Symposium, Jun. 9-13, 1986 (17 pages).

Bustin et al., Mechanisms of graphite formation from kerogen: experimental evidence, International Journal of Coal Geology, vol. 28, Issue 1, Oct. 1995, pp. 1-36.

Ferralis et al., Direct Correlation Between Aromatization of Carbon-Rich Organic Matter and Its Visible Electronic Absorption Edge, Carbon 88 (Jul. 2015): 139-147).

Herron et al., Borehole Elemental Concentration Logs Now Available: A new source of Geochemistry Data, published at http://www.ldeo.columbia.eduires/div/mgg/lodos/Education/Logging/slides/Geochemical_logging_pdf on Apr. 4, 2008, 46 pages.

Misra et al., "Dielectric Effects in Pyrite-Rich Clays on Multifrequency Induction Logs and Equivalent Laboratory Core Measurements," SPWLA-2016-Z, SPWLA 57th Annual Logging Symposium, Jun. 25-29, Reykjavik, Iceland, 2016, 17 pages.

Misra et al., "Interfacial polarization of disseminated conductive minerals in absence of redox-active species—Part 1: Mechanistic model and validation," Geophysics, Mar. 2016, vol. 81, No. 2, pp. E139-E157.

Misra et al., "Interfacial polarization of disseminated conductive minerals in absence of redox-active species—Part 2: Effective electrical conductivity and dielectric permittivity," Geophysics, Mar. 2016, vol. 81, No. 2, pp. E159-E176.

Misra et al., "Laboratory Investigation of Petrophysical Applications of Multi-Frequency Inductive-Complex Conductivity Tensor Measurements," IDSPWLA-2015-Y, SPWLA 56th Annual Logging Symposium, Jul. 18-22, Long Beach, California, USA, 2015, 13 pages.

Misra et al., Complex Electrical Conductivity of Mudrocks and Source-Rock Formations Containing Disseminated Pyrite, SPE-178650-2163422-MS URTEC, Unconventional Resources Technology Conference (URTeC), San Antonio, Texas, USA, Jul. 20-22, 2015, 15 pages.

Ohtomo et al., Evidence for biogenic graphite in early Archaean Isua metasedimentary rocks, Nature Geoscience 7(1), Dec. 2013.

Pathak et al., Kerogen Swelling and Confinement: Its implication on Fluid Thermodynamic Properties in Shales, Scientific Reports, vol. 7., Article No. 12530, Dec. 1, 2017, 14 pages.

Petersen et al., Reflectance measurements of zooclasts and solid bitumen in Lower Paleozoic shales, southern Scandinavia: Correlation to vitrinite reflectance, International Journal of Coal Geology, vol. 114, Jul. 30, 2013, pp. 1-18.

Revil et al., Induced polarization response of porous media with metallic particles—Part 1: A theory for disseminated semiconductors, Geophysics, vol. 80, No. 5 (Sep.-Oct. 2015); pp. D525-D538.

Revil et al., Induced polarization response of porous media with metallic particles—Part 5: Influence of the Jackground polarization, Geophysics, vol. 82, No. 2 (Mar.-Apr. 2017); p. E97-E110.

Revil et al., Induced polarization response of porous media with metallic particles—Part 6: The case of metals and semimetals, Geophysics, vol. 82, No. 2 (Mar.-Apr. 2017); p. E77-E96.

* cited by examiner

METHOD AND APPARATUS FOR EVALUATION OF HYDROCARBON-BEARING RESERVOIRS

CROSS-REFERENCE TO RELATED APPLICATIONS

This application claims the benefit of and priority to U.S. Provisional Application No. 62/098,513, entitled "Method and Apparatus for Evaluation of Hydrocarbon-Bearing Reservoirs," filed Dec. 31, 2014, the entire disclosure of which is hereby incorporated herein by reference.

BACKGROUND OF THE DISCLOSURE

The present application relates to exploration and development of subterranean hydrocarbon-bearing formations. More specifically, the present application relates to evaluation of kerogen rich unconventional hydrocarbon-bearing shale reservoirs.

Shale is an abundant sedimentary rock of extremely low permeability. It is often considered a natural barrier to the migration of oil and gas. In organic rich shales, the oil and gas is generated in place. The organic shale acts as both the source rock and the reservoir. The hydrocarbons can be stored interstitially within the pore spaces between rock grains or fractures in the shale, or it can be adsorbed to the surface of organic components contained within the shale. This is in contrast to conventional gas reservoirs in which gas migrates from its source rock into a sandstone or carbonate formation where it accumulates in a structural or stratigraphic trap, often underlain by a gas/water contact. Therefore, organic rich shales are considered unconventional reservoirs.

Shale-hydrocarbon is produced from continuous accumulations, which may have the following characteristics: regional extent, lack of an observable seal and trap, absence of a well-defined gas/water contact, natural fracturing, estimated ultimate recovery that is generally lower than that of a conventional accumulation, and very low matrix permeability. Furthermore, economic production depends heavily on completion technology.

Despite their apparent shortcomings, in the USA and other parts of the world, certain shales are being targeted for production—those with the right combination of shale type, organic content, maturity, permeability, porosity, hydrocarbon saturation and formation fracturing. When these formation conditions are triggered by favorable economic conditions, the unconventional shale-hydrocarbon play becomes a boom. Today's shale-hydrocarbon plays are taking off, due in large part to a growing demand for gas and to a growing range of advanced oilfield technologies.

Shale comprises clay- and silt-sized particles that have been consolidated into rock layers of low permeability. Clearly, this description offers little to commend shale as a target for exploration and development. However, some shales are known to contain enough organic matter to generate hydrocarbons. Whether these shales are actually capable of generating hydrocarbons, and whether they generate oil or gas, depends largely on the amount and type of organic material they contain; the presence of trace elements that might enhance chemogenesis; and the magnitude and duration of heating, pressure, and diagenesis to which they have been subjected.

Organic matter (the remains of animals and/or plants) can be thermally altered to produce oil or gas. Before this transformation can take place, however, these remains are first preserved to some degree. The degree of preservation will have an effect on the type of hydrocarbons the organic matter will eventually produce. Most animal or plant material is consumed by other animals, bacteria or decay, so preservation involves quick burial in an anoxic environment that will inhibit most biological or chemical scavengers. This requirement is met in lake or ocean settings that have restricted water circulation, where biological demand for oxygen exceeds supply. Even in these settings, however, anaerobic microorganisms can feed off the buried organic matter, producing biogenic methane in the process. Further sedimentation increases the depth of burial over time. The organic matter slowly cooks as pressure and temperature increase in concert with greater burial depths. With such heating, the organic matter is transformed into kerogen. Depending on the type of kerogen produced, further increases in temperature, pressure and time may yield oil, wet gas or dry gas. Kerogen has been classified into four broad groups (Types I, II, III and IV), each of which has a distinct bearing on what type of hydrocarbons, if any, will be produced.

Type I kerogen is generated predominantly from lacustrine environments and, in some cases, marine environments. It is derived from algae, planktonic or other organic matter that has been strongly reworked by bacteria and microorganisms living in the sediment. Rich in hydrogen and low in oxygen, it is prone to oil production, but can also produce gas, depending on its stage of maturation. Type I kerogen is not found widely, and it is estimated that Type I kerogen is responsible for 2.7% of the world's oil and gas reserves.

Type II kerogen is generated in reducing environments found in moderately deep marine settings. Type II kerogen is derived primarily from the remains of plankton that have been reworked by bacteria. It is rich in hydrogen and low in carbon. It can generate oil or gas with progressive heating and maturation. Sulfur is associated with this type of kerogen, either as pyrite and free sulfur, or in organic structures of the kerogen.

Type III kerogen is derived primarily from terrestrial plant debris that has been deposited in shallow to deep marine or non-marine environments. Type III kerogen has lower hydrogen and higher oxygen content than Types I or II, and consequently generates mostly dry gas.

Type IV kerogen is derived from older sediments redeposited after erosion. Prior to deposition, it may have been altered by sub-aerial weathering, combustion or biological oxidation in swamps or soils. This type of kerogen includes residual organic matter with high carbon content and very little hydrogen. It is considered a form of "dead carbon," with very limited potential for generating hydrocarbons.

From this discussion, it can be generalized that marine or lacustrine kerogen (Types I and II) tends to produce oils, while kerogen of terrestrial origin (Type III) produce gas. Intermediate blends of kerogen, especially blends of Types II and III, are most common to marine shale facies. A theme prevailing within the kerogen classification scheme pertains to hydrogen content. Hydrogen-rich kerogen (Types I and II) plays a greater role in generating oil. Conversely, kerogen with lower amounts of hydrogen (Type III) plays a greater role in generating gas. After hydrogen is depleted from the kerogen, generation of hydrocarbons will cease naturally, regardless of the amount of available carbon.

Geological processes for converting organic material to hydrocarbons involves heat and time. Heat gradually increases over time as the organic matter continues to be buried deeper under increasing sediment load. Time is measured over millions of years. Through increasing temperature and pressure during burial, and possibly accelerated by the presence of catalyzing minerals, organic materials give off oil and gas. This process is complicated and not fully understood; however, the conceptual model is fairly straightforward. Microbial activity converts some of the organic material into biogenic methane gas. With burial and heating, the remaining organic materials are transformed into kerogen. Further burial and heat transform the kerogen to yield bitumen, then liquid hydrocarbons, and finally thermogenic gas-starting with wet gas and ending at dry gas. The process of burial, conversion of organic matter and generation of hydrocarbons can generally be summed up in a sequence of three steps (diagenesis/catagenesis/matagenesis).

Diagenesis is often characterized by low-temperature alteration of organic matter, such as at temperatures below about 50° C. [122° F.]. During this stage, oxidation and other chemical processes begin to break down the organic material. Biological processes will also alter the amount and composition of organic material before it is preserved. At this point, bacterial decay may produce biogenic methane. With increasing temperatures and changes in pH, the organic matter is gradually converted to kerogen and lesser amounts of bitumen. During the early phases of diagenesis, sulfur may be incorporated into the organic matter. Sulfates in seawater provide the oxidant source for biodegradation of organic matter by sulfate-reducing bacterial colonies. These bacteria release polysulfides, hydrogen sulfide [$H_2S$] and native sulfur, which can later recombine with iron in clays to form pyrite [$FeS_2$], or combine with the organic matter to form other organosulfur compounds.

Catagenesis generally occurs as further burial causes more pressure, thereby increasing heat in the range of approximately 50° C. to 150° C. [122° F. to 302° F.], causing chemical bonds to break down within the shale and the kerogen. Hydrocarbons are generated during this process, with oil produced by Type I kerogen, waxy oil produced by Type II kerogen, and gas produced by Type III kerogen. Further increases in temperature and pressure cause secondary cracking of the oil molecules, resulting in production of additional gas molecules.

Metagenesis is the last stage, in which additional heat and chemical changes result in almost total transformation of kerogen into carbon. During this stage, late methane, or dry gas is evolved, along with non-hydrocarbon gases such as $CO_2$, $N_2$ and $H_2S$. In basins where these changes take place, temperatures generally range from about 150° C. to 200° C. [302° F. to 392° F.]. This process of kerogen alteration, commonly known as "maturation," produces a series of progressively smaller hydrocarbon molecules of increasing volatility and hydrogen content, eventually arriving at methane gas. And as the kerogen evolves through thermal maturity, its chemical composition progressively changes, transforming into a carbonaceous residue of decreasing hydrogen content, eventually ending as graphite.

The preservation and maturation of organic matter are not unique to gas shales. The model for generating oil and gas is actually the same for conventional and unconventional resources. The difference, however, is location. In conventional reservoirs, oil and gas migrate from the source rock to the sandstone or carbonate trap. In unconventional shale-gas reservoirs, hydrocarbons are produced directly from the source rock.

Source-rock potential is primarily determined through geochemical analysis of shale samples, often in conjunction with detailed evaluation of logs from previously drilled wells. Geochemical testing is carried out on whole cores, sidewall cores, formation cuttings and outcrop samples. The primary aim of testing is to determine whether the samples are organic-rich and whether they are capable of generating hydrocarbons. In general, the higher the concentration of organic matter in a rock, the better its source potential.

A variety of sophisticated geochemical techniques have been developed to assess the total organic carbon (TOC) and maturity of samples. TOC values can be obtained from 1-gram samples of pulverized rock that are treated to remove contaminants, then combusted at 1,200° C. [2,192° F.]. Carbon contained in the kerogen is converted to $CO_2$ or CO. The evolved carbon fractious are measured in an infrared cell, and converted to TOC, recorded as mass weight percent of rock. If this initial screening test detects samples of sufficient organic richness, they will be subjected to additional testing.

To further characterize organic richness, many geochemical laboratories use a programmed pyrolysis technique developed by the Institut Français du Parole. This method, which has become an industry standard for geochemical testing of source rock, involves approximately 50 mg to 100 mg of pulverized rock, and can be carried out in about 20 minutes. Each sample is heated in controlled stages through a pyrolysis test. During the first stage of heating to 300° C. [572° F.], free hydrocarbons in the rock are released from the matrix. As heat increases during the second stage to 550° C. [1,022° F.], volatile hydrocarbons formed by thermal cracking are released. In addition to hydrocarbons, the kerogen gives off $CO_2$ as temperatures climb from 300° C. to 390° C. [572° F. to 734° F.]. Organic compounds released through heating are measured by a flame-ionization detector. These measurements, along with temperature, are recorded on a chart and show three distinct peaks. These peaks give geochemists insight into the relative abundance of hydrogen, carbon and oxygen in the kerogen. With this information, geochemists can determine kerogen type and potential for oil and gas generation. The temperature at which the maximum release of hydrocarbons is detected corresponds to the tip of the S2 peak, and is called $T_{max}$. The thermal maturation of a sample can be tied to the value of $T_{max}$.

Vitrinite reflectance is another diagnostic tool for assessing maturation. A major component of kerogen, vitrinite is a shiny substance formed through thermal alteration of lignin and cellulose in plant cell walls. With increasing temperature, vitrinite undergoes complex, irreversible aromatization reactions, resulting in increased reflectance. Vitrinite reflectance was first used to diagnose the rank, or thermal maturity, of coals. This technique was later carried over to evaluate thermal maturity of kerogen. Because reflectance increases with temperature, it can be correlated to temperature ranges for hydrocarbon generation. These ranges can be further divided into oil or gas windows. Reflectivity (R) is measured through a microscope equipped with an oil-immersion objective lens and photometer. Vitrinite-reflectance measurements are carefully calibrated against glass- or mineral-reflectance standards, and reflectance measurements represent the percentage of light reflected in oil (Ro). When a mean value of vitrinite reflectivity is determined from multiple samples, it is designated as Rm. As an indicator of thermal maturity, Ro values vary from one organic type to another. This means that the onset of hydrocarbon generation in Type I kerogen may be different than in Type II kerogen. And because the temperature range of the gas window extends beyond that of oil, Ro values for gas will show a corresponding increase over those of oil. Thus, high maturation values (Ro>1.5%) generally indicate the presence of predominantly dry gas; intermediate maturation values (1.1%<Ro<1.5%) indicate gas with an increasing tendency toward oil generation at the lower end of the range. Wet gas can be found still lower in the range (0.8%<Ro<1.1%). Lower values (0.6%<Ro<0.8%) indicate predominantly oil, while Ro<0.6% points to immature kerogen. By themselves, Ro values can sometimes be misleading, and should be weighed along with other measurements. Other common indicators of maturity involve the thermal alteration index (TAI), based on microscopic examination of spore color; pyrolysis temperature evaluation; and, to a lesser extent, conodont alteration index (CAI), based on examination of tiny fossilized teeth. Owing to the popularity of vitrinite reflectance, these other indicators are often correlated to Ro values.

Other shale properties can be estimated from well logs, which in some cases produce distinctive signatures. High gamma ray activity is thought to be a function of kerogen in the shale. Kerogen generally creates a reductive environment that drives the precipitation of uranium, which influences the gamma ray curve. Resistivity may be high because of high gas saturations, but varies with fluid content and clay type. Bulk densities are often low because of clay content and the presence of kerogen, which has a low specific gravity of 0.95 to 1.05 g/cm. Well logs are also used to ascertain the complex mineralogy of shale and to quantify the amount of free gas in the pores of the source rock. Petrophysicists have used a combination of conventional triple-combo and geochemical logs to determine the organic carbon content of the shale and calculate for adsorbed gas. Geochemical logs also enable petrophysicists to differentiate types of clays and their respective volumes, information useful for calculating producibility and for determining which fluid to use during subsequent hydraulic fracturing treatments.

SUMMARY

In one aspect, the present application provides for evaluation of a hydrocarbon-bearing shale formation with the use of a data processing system that defines a response model that relates first data representing measured petrophysical properties of the shale formation at a given location in the shale formation to second data representing volume fractions for a particular set of formation components at the given location in the shale formation. The first data includes hydrogen index at the given location of the shale formation, and the particular set of formation components of the second data include a number of mineral components and a number of hydrocarbon-bearing components. The hydrocarbon-bearing components include an immature kerogen component and a fully mature kerogen component. The data processing system transforms third data representing concentration of a number of chemical elements at the given location in the shale formation to the fourth data representing concentration of the particular set of formation components at the given location in the shale formation. The chemical elements of the third data include at least one of hydrogen, carbon and oxygen. The data processing system further defines a mathematical model that relates the fourth data to the second data representing volume fractions for the particular set of formation components. A computation solver processes the response model and the mathematical model along with the first data to solve for the second data representing volume fractions for the particular set of formation components. The solved second data representing the volume fraction of the immature kerogen component as well as the solved second data representing the volume fraction of the fully mature kerogen component are processed to derive a first ratio and a second ratio. The first ratio is indicative of hydrogen content relative to carbon content for total kerogen at the given location in the shale formation. The second ratio is indicative of oxygen content relative to carbon content for total kerogen at the given location in the shale formation. The total kerogen includes both the immature kerogen component and the fully mature kerogen component at the given location in the shale formation. The first and second ratios are used to ascertain characteristics of the total kerogen at the given location in the shale formation.

In one embodiment, the first and second ratios are used in conjunction with a Van-Krevelen diagram to ascertain a kerogen type and maturity level for the total kerogen at the given location in the shale formation. The first and second ratios can also be used in conjunction with the Van-Krevelen diagram to ascertain propensity of the total kerogen at the given location in the shale formation to generate gas-phase hydrocarbons or liquid-phase hydrocarbons.

In another embodiment, the data processing system uses the first and second ratios in conjunction with a polynomial expression representing a respective pathway of a Van-Krevelen diagram to ascertain a maturity level for the total kerogen at the given location in the shale formation.

In yet another embodiment, the first and second ratios are derived from a calculation of total organic carbon of the total kerogen at the given location in the shale formation, wherein the calculation of total organic carbon is based upon the mathematical model and the solved second data representing volume fraction of the immature kerogen component as well as the solved second data representing volume fraction of the fully mature kerogen component.

The first data can be derived from measurements made by one or more logging tools located within a borehole that traverses the shale formation. The third data can be derived from measurements of a gamma-ray spectroscopy tool located within a borehole that traverses the shale formation. In one embodiment, the gamma-ray spectroscopy tool employs inelastic neutron scattering to measure concentration of at least one of hydrogen, oxygen and carbon as part of the third data.

In one embodiment, the mathematical model relates concentrations of the particular set of formation components to volume fractions for the particular set of formation components based upon bulk density of the individual formation components, bulk density of the mixture of formation components of the set, and concentrations of the individual formation components.

In another aspect, the present application provides for evaluation of a hydrocarbon-bearing shale formation with the use of a data processing system that defines a response model that relates first data representing measured petrophysical properties of the shale formation at a given location in the shale formation to second data representing volume fractions for a particular set of formation components at the given location in the shale formation. The first data includes hydrogen index at the given location of the shale formation, and the particular set of formation components of the second data include a number of mineral components and a number of hydrocarbon-bearing components. The hydrocarbon-bearing components includes at least one kerogen component. The data processing system employs a computation solver to process the response model along with the first data to solve for the second data representing volume fractions for the particular set of formation components. The data processing system uses the solved second data representing volume fraction of the at least one kerogen component to derive at least one ratio indicative of maturity of kerogen at the given location in the shale formation.

In one embodiment, the at least one ratio is used in conjunction with a Van-Krevelen diagram to ascertain maturity level for kerogen at the given location in the shale formation. The at least one ratio can also be used in conjunction with the Van-Krevelen diagram to ascertain propensity of kerogen at the given location in the shale formation to generate gas-phase hydrocarbons or liquid-phase hydrocarbons.

In another embodiment, the data processing system uses the at least one ratio in conjunction with a polynomial expression representing a respective pathway of a Van-Krevelen diagram to ascertain a maturity level for the total kerogen at the given location in the shale formation.

The first data can be derived from measurements made by one or more logging tools located within a borehole that traverses the shale formation.

DETAILED DESCRIPTION

Figure 1:
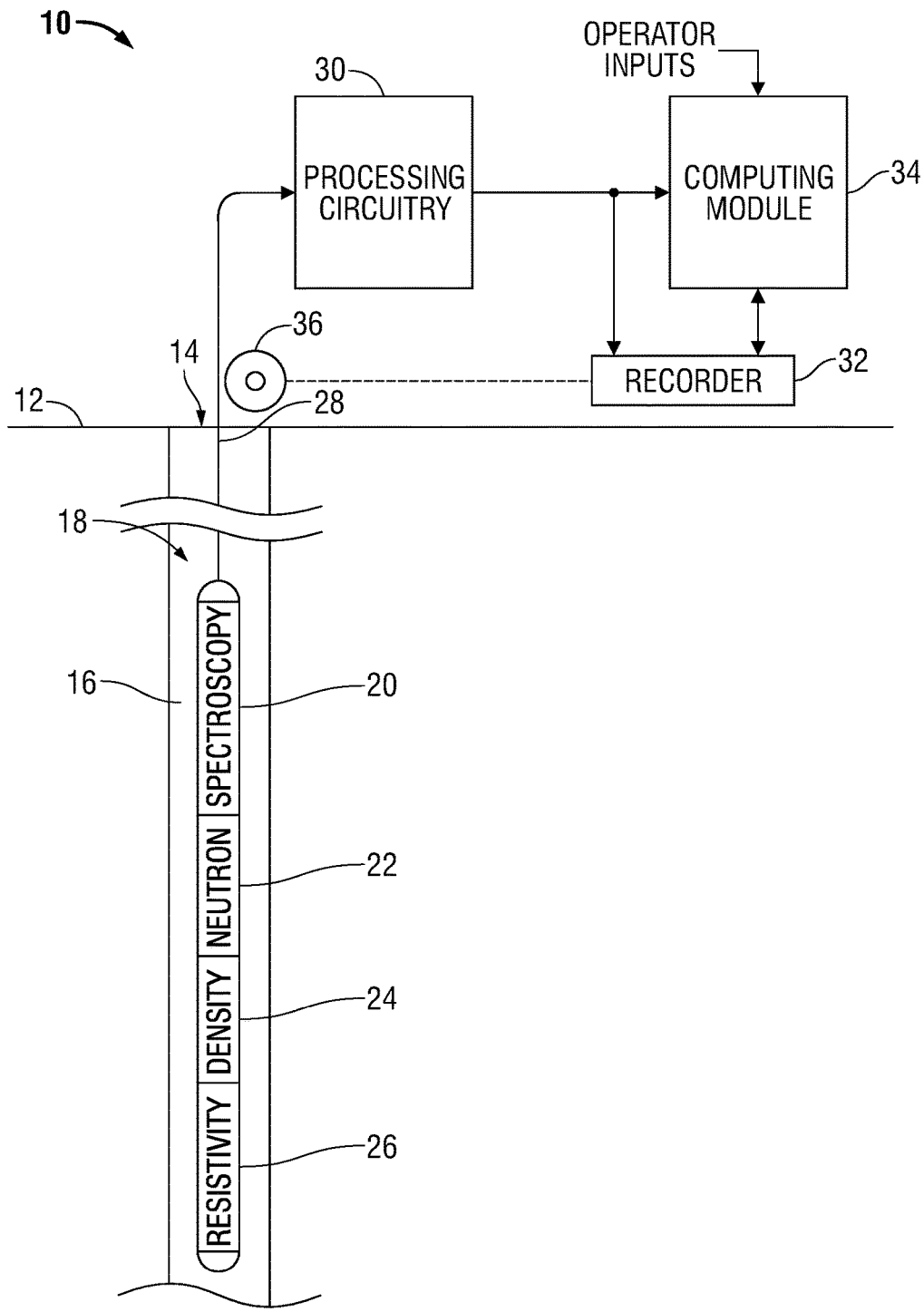
FIG. 1 is a schematic representation of an acquisition and processing system deployed within a subsurface formation in accordance with certain embodiments of the present application.
Figure 2A:
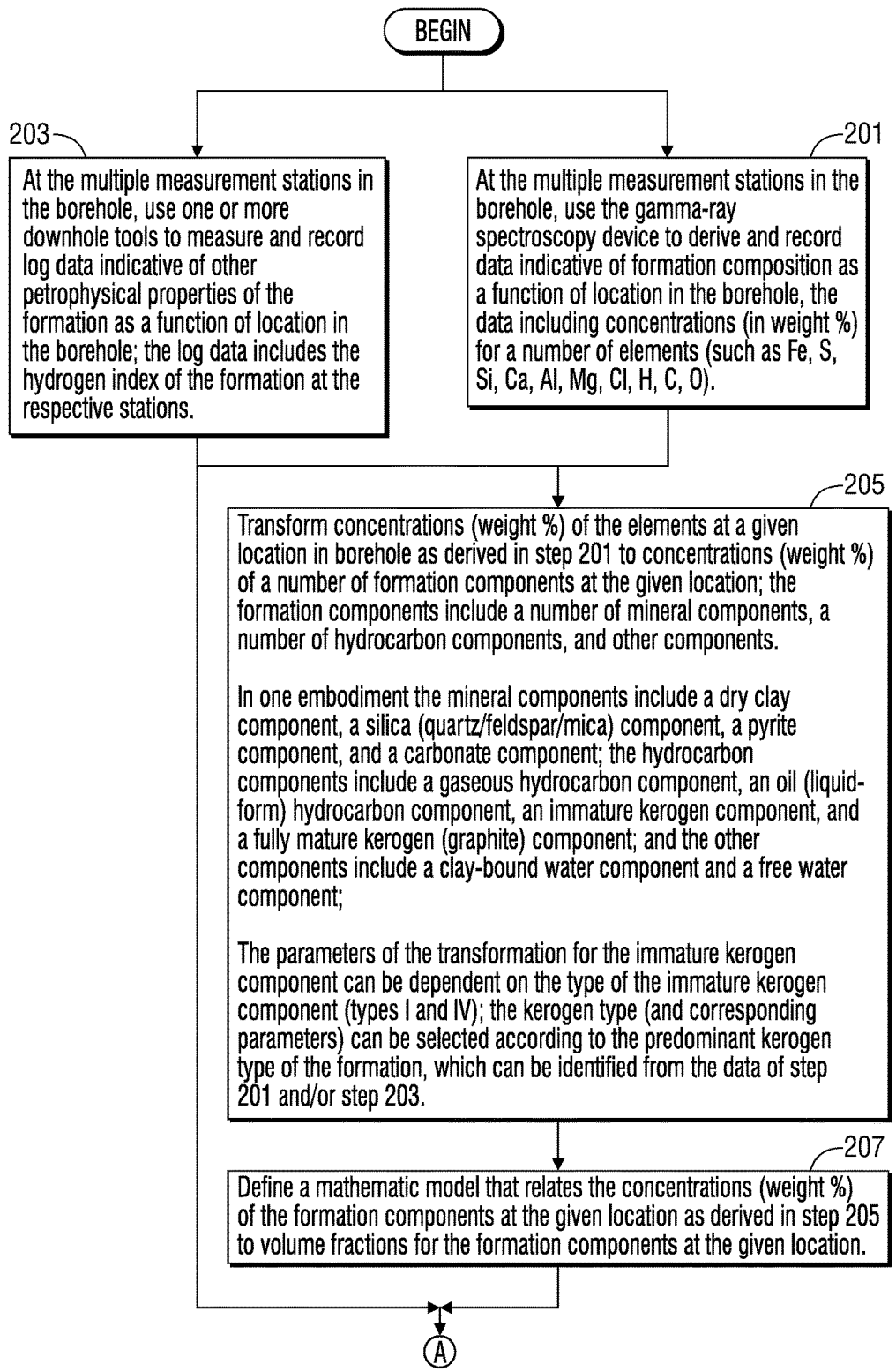
FIGS. 2A-2D, collectively, is a flow chart illustrating data flow and process steps carried out in conjunction with the acquisition and processing system of FIG. 1 in accordance with certain embodiments of the present application.
Figure 2B:
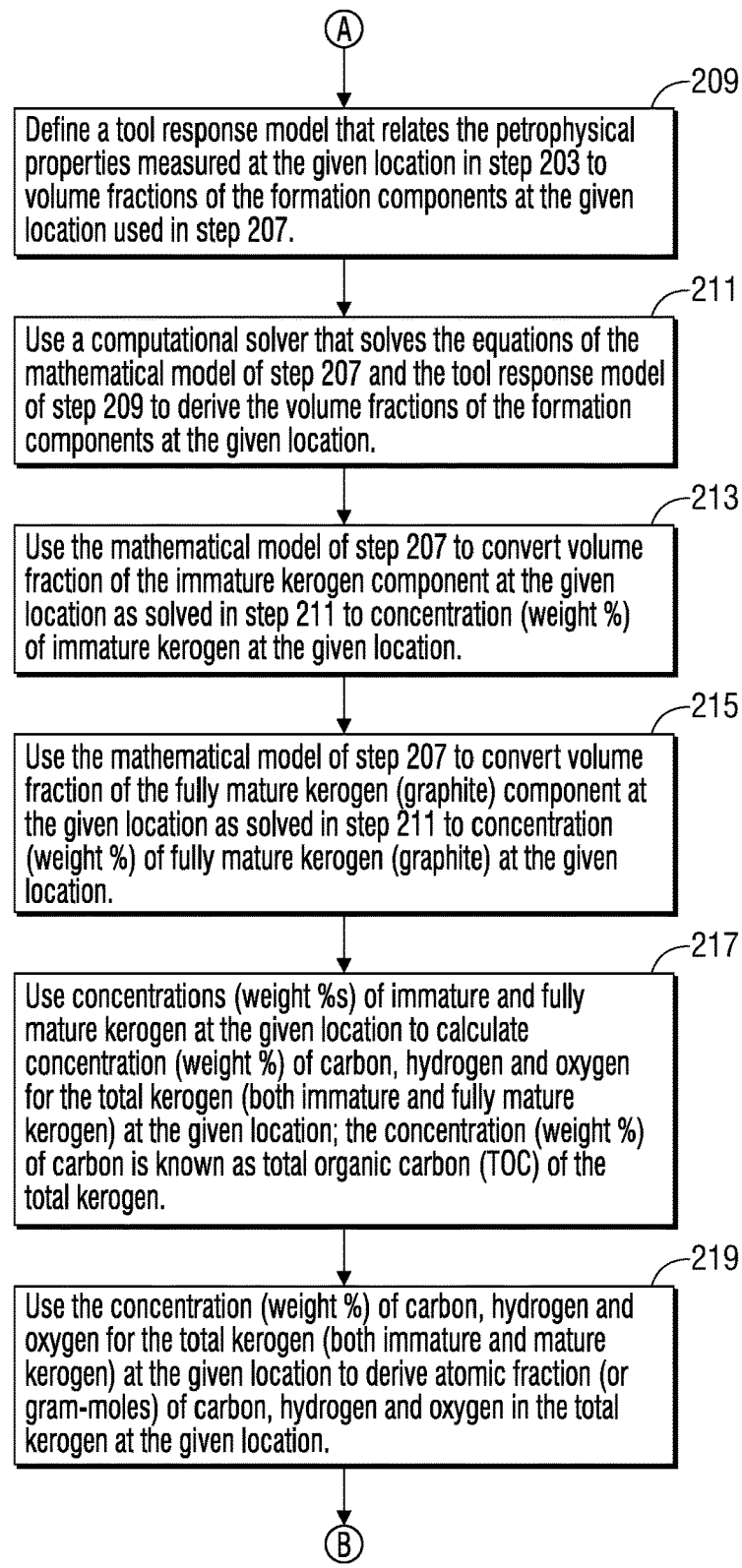
Figure 2C:
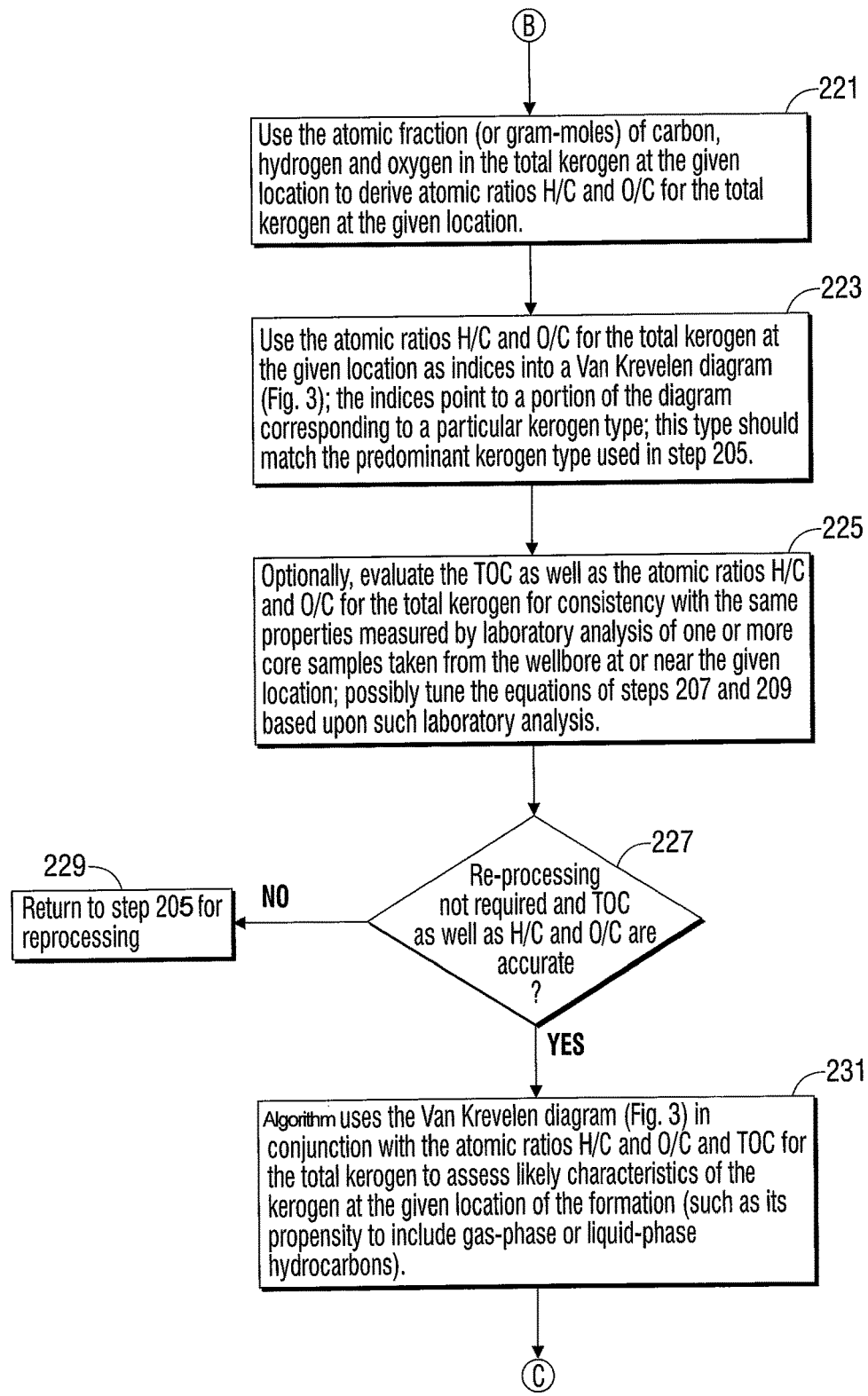
Figure 2D:
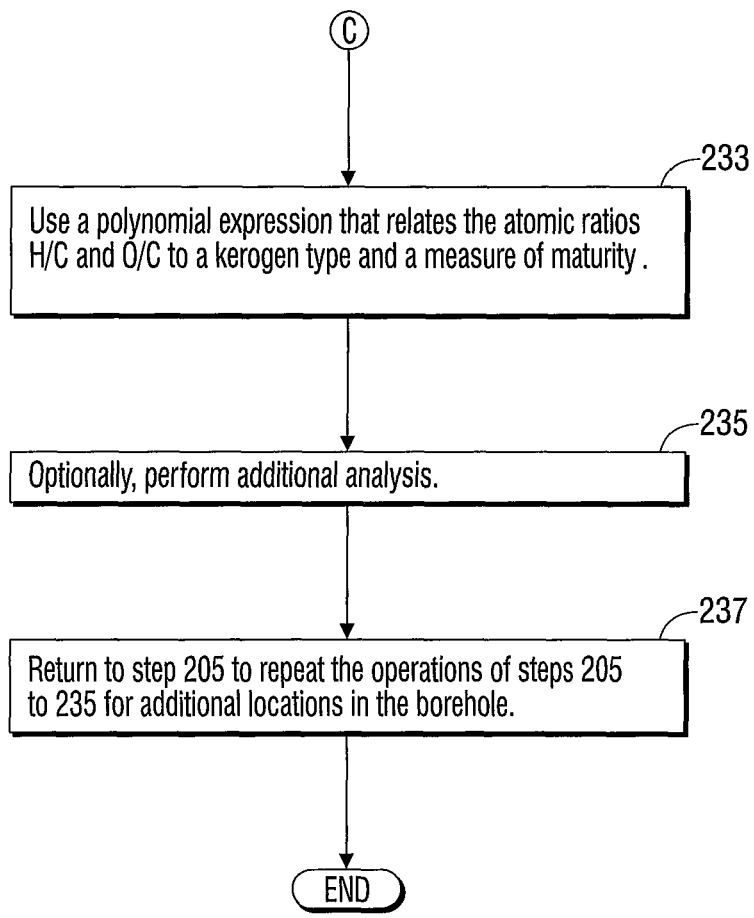

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 shows an apparatus adapted to evaluate petrophysical properties of a subsurface shale formation in accordance with certain embodiments of the present disclosure. An acquisition and processing system 10 is shown deployed within a subsurface formation 12, which may be a shale formation or any other hydrocarbon-bearing formation. A borehole 14 has been drilled through the subsurface formation 12 and is filled with a drilling fluid 16. The system 10 includes a logging tool 18 that is suspended in the borehole 14 on an armored cable 28, the deployed length of which substantially determines the depth of the logging tool 18 within the subsurface formation 12. The cable length is controlled by conventional means at the surface (not shown). The logging tool 18 measures petrophysical properties of the subsurface formation 12 at one or more depths (or locations) in the borehole 14. Multiple logging tools 18 can be used to measure different petrophysical properties of the subsurface formation 12 at one or more depths (or locations) in the borehole 14. In one particular embodiment of the present application, the one or more logging tools 18 include a neutron-induced gamma-ray spectroscopy device 20, a neutron device 22, a density device 24, a resistivity device 26 and possibly additional devices (not shown) such as a spectral gamma ray device, a sonic device, a dielectric scanner device, and a nuclear magnetic resonance device. Circuitry 30, shown at the surface, although portions thereof may be located downhole, represents processing circuitry for the various components of the one or more logging tools 18. A sheave wheel 36 can be provided to determine the depth of the logging tool 18, and signals therefrom are coupled with a recorder 32, which represents electrical, magnetic, optical, graphical, and/or other storage and recording techniques performed on signals received from the processing circuitry 30.

The neutron-induced gamma-ray spectroscopy device(s) 20 measures and records data representative of formation composition, including measurements of concentrations of a plurality of elements, iron (Fe), sulfur (S), silicon (Si), aluminum (Al), chlorine (Cl), calcium (Ca), magnesium (Mg), titanium (Ti), gadolinium (Gd), and barium (Ba). Such measurements can be provided by tools that use an americium beryllium (AmBe) neutron source and a bismuth germanate (BGO) detector to measure elemental concentrations based on neutron-induced capture gamma ray spectroscopy whereby gamma rays are produced when a pulse of neutrons bombard the formation and lose energy as they are scattered. The BGO detector measures the energy spectrum of gamma rays produced by the neutron bombardment at various times both during and after the neutron pulse. Neutrons can interact with matter in two distinct ways to create gamma rays: by inelastic scattering with nuclei at high energies (>5 MeV) and, through capture or absorption by nuclei at low energies (<0.025 MeV). The inelastic scattering reaction occurs primarily during the neutron pulse. The capture or absorption reaction occurs after the neutron pulse. The gamma rays produced from each of these reactions have unique energies that depend on the type of nucleus with which the neutron reacts. By measuring the number and energy of gamma rays produced by neutron bombardment, the elemental composition of the formation can be inferred. Specifically, spectral deconvolution of the composite gamma ray energy spectrum using a set of elemental standards produces relative elemental yields for a number of principal elements such as silicon (Si), iron (Fe), calcium (Ca), sulfur (S), titanium (Ti) gandolinium (Gd), chlorine (Cl), magnesium (Mg), barium (Ba) and hydrogen (H). An oxide closure method is used to convert the relative elemental yields to concentrations (e.g., dry weight percentages) for a number of elements such as silicon (Si), iron (Fe), calcium (Ca), sulfur (S), titanium (Ti) and gandolinium (Gd). The oxide closure methodology relates the concentration of the unmeasured elements in the rock or mineral matrix to the concentrations of the measured elements in the rock or mineral matrix. This allows the transformation of relative yields or count rates from the spectroscopy measurement to dry weight percent of the elements contained in the rock matrix, excluding the pore fluid. An example of the oxide closure method is described in U.S. Pat. No. 5,471,057, commonly assigned to the assignee of the present disclosure and herein incorporated by reference in its entirety. In the oxide closure method, the kerogen contribution to capture derived elemental dry weight percentages is also excluded, as described in detail below. Specifically, the present embodiments describe how to properly account for the kerogen dry weight. The concentration (e.g., dry weight percentage) of aluminum or magnesium contained in the rock matrix, excluding the pore fluid, may be derived from the oxide closure method described in U.S. Pat. No. 5,471,057. Concentration (e.g., weight percentage) of hydrogen, carbon and oxygen which is contained in the formation (including the rock matrix, pore fluids and kerogen) can be measured from correlation to the gamma ray energies resulting from the inelastic neutron scattering reaction and involve neutron energy on the order of approximately 14 MeV. In addition, the spectroscopy measurements may respond to the presence of carbon and oxygen anywhere in the rock matrix, the pore fluids, and the kerogen. As described in detail below, the model may or may not exclude contributions from carbon and oxygen, and the model may differentiate between organic and inorganic carbon. In addition, the concentration (e.g., weight percentage) of chlorine which is contained in both the rock matrix (as part of bound water in clay) and the pore fluids (as part of free water not associated with clay) may also be derived from the oxide closure method described in U.S. Pat. No. 5,471,057. The particulars of inelastic neutron scattering are well known and described in U.S. Pat. No. 3,849,646, herein incorporated by reference in its entirety.

The neutron device 22 contains a radioactive source (e.g., a chemical or electronic radioactive source) that bombards the formation 12 with fast neutrons, which are slowed primarily by hydrogen atoms in the formation 12. Detectors count the slowed neutrons deflected back to the device 22 to measure hydrogen index (HI) of the formation 12. The hydrogen index represents the number of hydrogen atoms per unit volume divided by the number of hydrogen atoms per unit volume of pure water at surface conditions. In other words, the hydrogen index represents (the number of atoms H in X/(gm-mol X/density X))/(2/(18 gm-mol $H_2O$/1 gm/cc)). The hydrogen index measurements can be converted to porosity values of the formation 12. The neutron device 22 can also be capable of pulsed-mode operations for measuring sigma. Sigma is the macroscopic cross section for the absorption of thermal neutrons, or capture cross section, of a volume of matter (measured in capture units (c.u.)).

The density device 24 measures and records the bulk density of the formation based on the reduction in gamma ray flux between a source and a detector due to Compton scattering. The gamma ray source (e.g., Cs-137 (cesium)) is chosen so that gamma ray energies are high enough to interact by Compton scattering but not by pair production. The density device 24 can also measure photoelectric absorption properties of the formation. The measured photoelectric absorption properties of the formation can include the photoelectric factor (PEF), which is defined as $(Z/10)3.6$, where Z is the average atomic number of the formation. PEF is unitless, but since it is proportional to the photoelectric cross section per electron, it is sometimes quoted in barns/electron. The PEF can be converted to the simpler volumetric cross section, U in barns/cm3, by taking the product of PEF and bulk density of the formation. Such measurements can be provided by Schlumberger's Three-Detector Lithology Density (TLD) tool which is part of the HRMS sonde of the Platform Express toolstring or the Litho-Density sonde which is part of the Integrated Porosity Lithology toolstring.

The resistivity device 26 measures resistivity (and its reciprocal—conductivity) of the formation. The resistivity device 26 can be an induction-type device induces alternating current loops in the formation and measures the resultant signal in a receiver. In the simplest device, an alternating current is passed through a transmitter coil, thereby inducing an alternating magnetic field in the formation. This field creates current loops in the formation. The loops produce their own magnetic field, which induce a current when they cross the receiver coil. This signal is proportional to the conductivity (reciprocal of resistivity) of the formation, with contributions from different regions of the formation summing approximately in conductivity. Multiple transmitting and receiving coils can be used to focus formation current loops both radially (depth of investigation) and axially (vertical resolution). The resistivity device 26 can also be a laterolog-type device which emits an electric current from an electrode directly into the formation. Return electrodes measure the current returning to the device. Guard electrodes focus the current into the formation and prevent current lines from fanning out or flowing directly to the return electrode through the borehole fluid. Most tools vary the voltage at the main electrode in order to maintain a constant current intensity. This voltage is therefore proportional to the resistivity of the formation. Because current flows from the device to the formation, these tools work with conductive borehole fluid. Such measurements can be provided by Schlumberger's Array Induction Imager Tool (AIT) or the High-Resolution Azimuthal Laterolog Sonde (HALS) which are part of the Platform Express toolstring.

The spectral gamma ray device (not shown) measures naturally occurring gamma rays in the formation. This measurement indicates the radioactive content of the formation. The measurements include values for thorium content in ppm, uranium content in ppm and potassium content in percent. A value of total natural radioactive content (such as in API units) can be derived from the values of thorium content, uranium content and potassium content. The spectral gamma ray device can be provided by Schlumberger's Natural Gamma Ray Spectrometry Tool (NGS), and the Hostile Environment Natural Gamma Ray Sonde (HNGS) which is part of the Integrated Porosity Lithology toolstring.

The sonic device (not shown) generates sound wave and measures the time it takes to reach detectors. This is used to measure an acoustic property of the formation, such as travel time (e.g., expressed in μs/ft) of the sound wave through the formation. The sonic device can be provided by Schlumberger's Sonic Scanner Tool.

The dielectric scanner device (not shown) employs an array of transmitters that transmit electromagnetic waves through the formation to an array of receivers. As the electromagnetic waves travel from the transmitters to the receivers, changes occur in amplitude and phase that are directly related to the dielectric permittivity (commonly referred to "dielectric constant") and electrical conductivity of the formation. Because there is a large contrast between the dielectric permittivity of water and that of oil and of rock, the dielectric scanner device makes a direct measurement of the water volume that is independent of the water salinity. Depending on the texture of the rock, the dielectric permittivity and electrical conductivity differ for different frequencies of the electromagnetic waves. This phenomena of the variation of formation dielectric properties as a function of the frequency is known as dielectric dispersion. The dielectric scanner device can also provide a measure of dielectric dispersion. In carbonate reservoirs, dielectric dispersion is related to the cementation and saturation factors that are represented by the exponents m and n in the Archie saturation equation. In shale reservoirs, dielectric dispersion is related to the shale volume, represented by the cation exchange capacity (CEC). The dielectric scanner device can be provided by Schlumberger's Dielectric Scanner Tool.

The nuclear magnetic resonance device (not shown) measures nuclear magnetic resonance (NMR) properties of hydrogen in the formation. There are two phases to the measurement: polarization and acquisition. In the polarization phase, the hydrogen atoms are aligned in the direction of a static magnetic field ($B_0$). This polarization takes a characteristic time T1. In the acquisition phase, the hydrogen atoms are tipped by a short burst from an oscillating magnetic field that is designed so that they precess in resonance in a plane perpendicular to $B_0$. The frequency of oscillation is the Larmor frequency. The precession of the hydrogen atoms induces a signal in the antenna. The decay of this signal with time is caused by transverse relaxation and is measured by the device. The decay is the sum of different decay times, called T2. The T2 distribution is the basic output of a NMR measurement. The T2 distribution can be processed to derive properties of the formation. For example, NMR porosity of the formation can be related to area under the distribution T2 curve. Pore size distribution can be related to the T2 distribution in water-saturated rock. Permeability can be related to the logarithmic-mean of the T2 distribution and NMR porosity, and multiple T2 data sets acquired with different acquisition parameters can differentiate between formation fluids. The nuclear magnetic resonance device can be provided by Schlumberger's MR Scanner Tool.

Control of the logging tool(s) 18 is maintained by the processing circuitry 30. A computing module 34, which interfaces to the processing circuitry 30, the data recorder 32 and operator inputs, employs data processing functionality (e.g., one or more microprocessors, associated memory, and other hardware and/or software) to implement data analysis on the data acquired by the devices of the tool(s) 18 and stored by the data recorder 32. The computing module 34 can be realized by a distributed data processing system wherein data measured by the tool 10 is communicated (e.g., in real time) over a communication link (e.g., a satellite link) to a remote location for data storage and/or data analysis as described herein. The data analysis can be carried out on a workstation or other suitable data processing system (such as a computer cluster or computing grid).

Although the components of FIG. 1 are shown and described above as being communicatively coupled and arranged in a particular configuration, persons of ordinary skill in the art will appreciate that the components of FIG. 1 can be communicatively coupled and/or arranged differently without departing from the scope of the present disclosure. In addition, the example methods, apparatus, and systems described herein are not limited to a particular conveyance type but, instead, may be implemented in connection with different conveyance types including, for example, coiled tubing, wireline, wired-drill-pipe, and/or other conveyance means known in the industry.

The data analysis operations performed by the computing module 34 in certain embodiments of the application are illustrated in the flow chart of FIGS. 2A-2D. The operations begin in step 201 by employing the gamma-ray spectroscopy device 20 of tool 18 of FIG. 1 at multiple measurement stations in the borehole 14 to measure and record data representative of formation composition as a function of location in the borehole. The measured data includes measurements of concentrations (in dry weight percentage) of a plurality of elements such iron (Fe), sulfur (S), silicon (Si), aluminum (Al), calcium (Ca), and magnesium (Mg) as well as concentrations (in weight percentage) of a plurality of additional elements such as hydrogen (H), oxygen (O) and carbon (C), and Chlorine (Cl) as described above.

In block 203, other devices of the one or more logging tools 18 of FIG. 1 are employed at the measurement stations in the borehole 14 to measure and record log data indicative of other petrophysical properties of the formation as a function of location in the borehole. The log data includes hydrogen index of the formation as function of borehole location, which can be measured by the neutron device 22 of the tool 18 of FIG. 1. The log data can be representative of other petrophysical properties of the formation, such as sigma (which can be measured by the neutron device 22 of FIG. 1), bulk density (which can be measured by the density device 24 of FIG. 1), photoelectric absorption properties of the formation such as PEF (which can be measured by the density device 24 of FIG. 1), resistivity and conductivity of the formation (which can be measured by the resistivity device 26 of FIG. 1), concentrations of thorium, uranium and potassium content as well a measure of total natural radioactive content (which can be measured by a spectral gamma ray device as described above), an acoustic property of the formation such as travel time (e.g., expressed in μs/ft) of a sound wave through the formation (which can be measured by a sonic device as described above), dielectric permittivity and possibly other related measurements (which can measured by a dielectric scanner tool as described above), and nuclear magnetic resonance (NMR) properties (such as porosity) of the formation (which can be measured by a nuclear magnetic resonance device as described above).

In block 205, the concentrations (weight %) of the elements at a given location in the borehole as derived in 201 are transformed to concentrations (weight %) of a number of formation components at the given location. The formation components include a number of mineral components, a number of hydrocarbon components, and other components. In one embodiment, the mineral components include a dry clay component, a silica (quartz/feldspar/mica) component, a pyrite component, and a carbonate component; the hydrocarbon components include a gas-form hydrocarbon component, an oil (liquid-form hydrocarbon) component, an immature kerogen component, and a fully mature kerogen (graphite) component; and the other components include a clay-bound water component and a free water component.

The transformation of block 205 can utilize association factors that describe the relationship between the elements and the formation components. Eqn. 1 below illustrates these relationships.

$$\text{Wt \% element}\_i = \text{Wt \% element}\_i \text{ in component}\_i * \text{Wt \% component}\_i \qquad \text{Eqn. (1)}$$

where Wt % element_i is the weight percentage of an element i as derived in block 201,
Wt % element_i in component_i is the weight percent of element i in the formation component i, which is an input parameter, and
Wt % component_i is a weight percent of component i in the formation, which is computed as part of block 205.

The respective input parameter for the weight percent of element i in the formation component i can be computed from the ratio of the atomic weight of the element i to that of the formation component i. Thus, Eqn. 1 relates elements to minerals. For example, silica is approximately 46.7 wt % silicon and approximately 53.3 wt % oxygen. Examples of input parameters for the elemental weight percentages for a number of formation components are set forth below in Table 1. In other words, Table 1 illustrates the response parameters in dry wt %. Eqn. 3, which is discussed below, is used to transform any measurements in dry wt % units to a volumetric basis. The transformation from measurements to volumes is performed by a minimization process, such as, but not limited to Schlumberger's ELAN solver. For example, a least squares minimization process may minimize the difference between a measurement and a theoretical measurement computed from the volumes solved for and the parameters or response values for that volume listed in Table 1. A solver, such as Schlumberger's ELAN solver, relies upon the fact that there is sufficient measurement sensitivity (the measurement is present that is influenced by the volume, the measurement response parameter is not zero, and the mineral or volume is present in sufficient quantities) present to solve for it. Table 2, which is discussed below, illustrates that there is sufficient measurement sensitivity. Therefore, the disclosed method does not use one measurement for each volume solved for. Instead, measurements with non-zero response parameters will contribute to determining the volume of any one component.

to the predominate carbonate type of the formation. The elemental weight percent parameters vary for these different carbonate types (as evident from the sixth column of Table 1). The particular clay type or carbonate type need not be chosen to solve for using the disclosed method. Instead, the minimization process may be used to solve for the listed types if desired. If core measurements or geology indicates that one or more clay types or carbonate types will not likely be present, then there would be no need to solve for that volume. The immature kerogen component can be selected from one of a number of different immature kerogen types including Type I kerogen, Type II kerogen, Type III kerogen, and Type IV kerogen as described above according to the predominant immature kerogen type of the formation. The elemental weight percent parameters vary for these different immature kerogen types (as evident from the tenth column of Table 1). The predominate immature kerogen type of the formation can be identified from geological information, the type of basin setting, core information, or the methods of the disclosed embodiments may be used to identify the kerogen type. Specifically, two independent kerogen volumes are solved for in the disclosed techniques. One represents a fully immature kerogen with its associated fixed parameters and

TABLE 1

Elemental Weight Percent Parameters Associated With Formation Components

| Element | dry clay (illite, smectite, chlorite, kaolinite, glauconite) | bound water | Pyrite | Silica | carbonate material (calcite, dolomite, siderite, ankerite) | free water | Gaseous hydro-carbons (for example, methane) | Oil (for example, decane) | immature kerogen, (Type I, Type II, Type III, Type IV) | graphite (fully mature kerogen) |
|---|---|---|---|---|---|---|---|---|---|---|
| Iron (Fe) | (2.8, 0, 38.1, 0, 9.6) | 0 | 46.6 | 0 | (0, 0, 48.2, 16.2) | 0 | 0 | 0 | (0, 0, 0, 0) | 0 |
| Sulfur (S) | (0, 0, 0, 0, 0) | 0 | 53.5 | 0 | (0, 0, 0, 0) | 0 | 0 | 0 | (0.08, 2.2, 0.08, 0.08) | 0 |
| Aluminum (Al) | (14.98, 12.28, 7.36, 20.9, 13.25) | 0 | 0 | 0 | (0, 0, 0, 0) | 0 | 0 | 0 | (0, 0, 0, 0) | 0 |
| Chlorine (Cl) | (0, 0, 0, 0, 0) | ~5 | 0 | 0 | (0, 0, 0, 0) | 1-30 | 0 | 0 | (0, 0, 0, 0) | 0 |
| Silicon (Si) | (24.1, 30.61, 11.49, 21.76, 22.77) | 0 | 0 | 46.7 | (0, 0, 0, 0) | 0 | 0 | 0 | (0, 0, 0, 0) | 0 |
| Calcium (Ca) | (0, 0, 0, 0, 0) | 0 | 0 | 0 | (40.04, 21.7, 0, 19.4) | 0 | 0 | 0 | (0, 0, 0, 0) | 0 |
| Magnesium (Mg) | (1.23, 2.19, 16.58, 0, 0) | 0 | 0 | 0 | (0, 13.18, 0, 3.5) | 0 | 0 | 0 | (0, 0, 0, 0) | 0 |
| Hydrogen (H) | (0.5, 0.55, 0.27, 1.56, 0.495) | | | | (0, 0, 0, 0) | 11.1 | 25.1 | 15.6 | (10.74, 8.39, 6.04, 3.35) | 0 |
| Carbon (C) | (0, 0, 0, 0, 0) | 0 | 0 | 0 | (12, 13, 10.4, 11.6) | 0 | 74.9 | 84.4 | (80, 80, 80, 80) | 100 |
| Oxygen (O) | 48.46, 52.31, 26.19, 55.78, 47.16 | 94.1 | 0 | 53.3 | 48, 52.1, 41.4, 46.5 | 88.9 | 0 | 0 | (7.46, 12.78, 17.05, 17.05) | 0 |
| H/C atomic ratio | | | | | | | | | (1.75, 1.4, 1.0, 0.5) | 0 |
| O/C atomic ratio | | | | | | | | | (0.07, 0.12, 0.16, 0.14) | 0 |

The clay component can be selected from one of a number of different clay types including illite, smectite, chlorite, kaolinite, glauconite according to the predominate clay type of the formation. The elemental weight percent parameters vary for these different clay types (as evident from the second column of Table 1). The carbonate component can be selected from one of a number of different carbonate types including calcite, dolomite, siderite, and ankerite according the other represents a fully mature kerogen (e.g., graphite) with its fixed associated response parameters. First, the geological depositional environment is determined in order to estimate the predominate kerogen type (e.g., 1, 2 or 3). This determination may be cross-checked as discussed in detail below. The inelastic sulfur measurement may also be used to distinguish between type 2 and types 1 and 3, as discussed in detail below.

In block 207, a mathematical model is defined that relates the concentrations (weight %) of the formation components as derived in block 205 to volume fractions for the formation components. The mathematical model can employ equations that relate the concentrations (in weight percentages) of the formation components to volume fractions for the formation components based upon the bulk density of the individual formation components, the bulk density of the mixture and the component weight percentages according to Eqn. (2) below:

$$\sum_{i=1}^{n} \text{Wt\% component\_i} = \sum_{i=1}^{n} \left( \frac{\rho_i * V_i}{\sum_{i=1}^{n} \rho_i * V_i} \right) \quad \text{Eqn. (2)}$$

where
Wt % component_i is the weight percent of formation component i output from block 205,
$\rho_i$ is the bulk density of the formation component i, which is an input parameter, and
$V_i$ is the volume fraction of the formation component i computed by solution of the mathematical model of block 207.

Note that porosity is not included in the summations of Eqn. (2).

Note that the bulk density $\rho_i$ of the respective formation component i varies for the different formation components. For the case where the clay component can be selected from one of a number of different clay types including illite, smectite, chlorite, kaolinite, glauconite, the bulk density of the clay component can be set to approximately 2.78 g/cc for illite, 2.63 g/cc for smectite, 3.42 g/cc for chlorite, 2.62 g/cc for kaolinite, and 2.85 g/cc for glauconite according to the predominate clay type of the formation. For the bound water component, the bulk density can be set to a value in the range of approximately 1.0 to 1.1 g/cc. For the pyrite component, the bulk density can be set to approximately 4.99 g/cc. For the silica component, the bulk density can be set to approximately 2.65 g/cc. For the case where the carbonate component can be selected from one of a number of different carbonate types including calcite, dolomite, siderite, and ankerite, the bulk density of the carbonate component can be selected from approximately 2.71 g/cc for calcite, 2.85 g/cc for dolomite, 3.89 g/cc for siderite, and 2.86 g/cc for ankerite according to the predominate carbonate type of the formation. For the free water component, the bulk density can be set to a value in the range of approximately 1.0 to 1.1 g/cc. For the gaseous hydrocarbon component, the bulk density can be set to a value in the range of approximately 0.2 to 0.4 g/cc. For the oil component, the bulk density can be set of a value of approximately 0.73. For the case where the immature kerogen component can be selected from one of a number of different immature kerogen types including Type I kerogen, Type II kerogen, Type III kerogen, and Type IV kerogen, the bulk density of the immature kerogen component can be set to a value in the range of approximately 1.1 to 1.3 g/cc. For the fully mature kerogen component, the bulk density can be set to approximately 2.27 g/cc.

In block 209, a tool response model is defined that relates petrophysical properties measured at a given location in the borehole in block 203 to volume fractions for the formation components used in block 207. More specifically, the tool response model includes an equation for each one of a number of the petrophysical properties measured at the given location in block 203, where the equation relates the measured petrophysical property to volume fractions for the formation components. For example, the log measurement of bulk density of the formation can be related to the volume fractions of the formation by:

bulk density, $$\rho_b = \sum_{i=1}^{n} \rho_i * V_i \quad \text{Eqn. (3)}$$

where
$\rho_b$=measured bulk density from log data of block 203,
$\rho_i$=bulk density of formation component i, which is an input response parameter that varies for the different formation components as described above, and
$V_i$=volume fraction of formation component i, computed by solution of the tool response model of block 209

The measurements in the rows of Table 2 are input to a general minimization solver such as, but not limited to, Schlumberger's ELAN solver. Each input measurement has an associated tool response equation written for it. For example, the density measurement is a function of the density of dry clay (parameter) multiplied by the volume of the dry clay (formation volume) plus the density of bound water multiplied by the volume of bound water, and so forth, as shown in Eqn. (3). Parameters are associated with each measurement with respect to it's response to each formation volume and are generally known from either chemical analysis, core measurements, or empirically derived. The minimization program solves for the various formation volumes given the input tool response equation and tool response parameters.

TABLE 2

Log Measurement Response Parameters Associated With Formation Constituent Volumes

| Log Measurement | dry clay (illite, smectite, chlorite, kaolinite, glauconite | bound water associated with the various dry clays | pyrite | silica | carbonate material (calcite, dolomite, siderite, ankerite) | free water not assoc with clays | Gas, $CH_4$, methane for example | oil, $C_{10}H_{22}$, decane for example | immature kerogen | graphite or fully mature kerogen |
|---|---|---|---|---|---|---|---|---|---|---|
| Hydrogen index from neutron measurement | .14, .13–.17, .25–.32, .34, 0.18 | 1 | −0.03–0 | 0.02 | 0–0.03 | 1 | 0.45 | 1.02 | 1.3–1.4 | 0 |
| Capture based Sigma (CU) | 40.6, 20.2, 43.7, 20.1, 89.6 | 30–40 | 90 | 4.3 | 7.1, 4.7, 52, 22 | 40–120 | ~4–8 | ~18–22 | ~7–11 | 0 |

TABLE 2-continued

Log Measurement Response Parameters Associated With Formation Constituent Volumes

| Log Measurement | dry clay (illite, smectite, chlorite, kaolinite, glauconite) | bound water associated with the various dry clays | pyrite | silica | carbonate material (calcite, dolomite, siderite, ankerite) | free water not assoc with clays | Gas, $CH_4$, methane for example | oil, $C_{10}H_{22}$, decane for example | immature kerogen | graphite or fully mature kerogen |
|---|---|---|---|---|---|---|---|---|---|---|
| Total Natural GR | 160, 168, 56, 104, 150 | 0 | 0 | 0 | 11, 8, 6 | 0 | 0 | 0 | 200-1000 | 200-1000 |
| Natural gamma ray (Th) (ppm) | ~20-40 | 0 | 0 | 0 | 0 | 0 | 0 | 0 | 0 | 0 |
| Natural gamma ray (U) (ppm) | ~5-10 | 0 | 0 | 0 | 0 | 0 | 0 | 0 | 200-1000 | 200-1000 |
| Natural gamma ray (K) (Wt %) | ~3-5 | 0 | 0 | 0 | 0 | 0 | 0 | 0 | 0 | 0 |
| Conductivity (siemens) | 0 | ~10 | 0- | 0 | 0 | ~30 | 0 | 0 | 0 | 100000 |
| Gamma-gamma density (gm/cc) | 2.78, 2.63, 3.42, 2.62, 2.85 | 1-1.1 | 4.99 | 2.65 | 2.71, 2.85, 3.89, 2.86 | 1-1.1 | 0.2-0.4 | 0.73 | 1.1-1.3 | 2.27 |
| Photoelectric (barns/electron) | 4.0, 2.89, 8.06, 2.05, 6.73 | 0.36-1.1 | 17 | 1.8 | 5.1, 3.1, 15, 9.3 | 0.36-1.1 | 0.095 | 0.12 | ~0.1 | 0.16 |
| Thermal Neutron measurement (PU) | 24.7, 21.8, 48.2, 45.1, 50 | 100 | -3-0 | -2 | 0, 1, 12, 1 | 100 | 0-20 | 102 | 130-140 | 0 |
| Acoustic compressional (us/ft) | 65-85 | ~190 | 62 | ~53-55 | 49, 44, 47, 44 | ~180-210 | ~400-600 | ~230 | ~80 | ~65 |
| Dielectric constant | 8, 9, 8, 8 | 30-35 | 8-10 | 7.2 | 9.1, 8.7, 8.9, 8.9 | 50-80 | 2-3 | 4.9 | 4-5 | 14 |
| Nuclear Magnetic Resonance Porosity (PU) | 0 | 1 | 0 | 0 | 0 | 1 | 0 | 1 | 0 | 0 |

Other equations can be used to relate other measured petrophysical properties, such as sigma (which can be measured by the neutron device 22 of FIG. 1), photoelectric absorption properties of the formation such as PEF (which can be measured by the density device 24 of FIG. 1), resistivity and conductivity of the formation (which can be measured by the resistivity device 26 of FIG. 1), concentrations of thorium, uranium and potassium content as well a measure of total natural radioactive content (which can be measured by a spectral gamma ray device as described above), an acoustic property of the formation such as travel time (e.g., expressed in μs/ft) of a sound wave through the formation (which can be measured by a sonic device as described above), dielectric permittivity and possibly other related measurements (which can measured by a dielectric scanner tool as described above), and nuclear magnetic resonance (NMR) properties (such as porosity) of the formation (which can be measured by a nuclear magnetic resonance device as described above). Input response parameters for the respective equations are generally known from either chemical analysis, core measurements or empirically derived.

In block 211, a computational solver is used to solve the equations of the mathematical model of block 207 and the tool response model of block 209 to derive the volume fractions of the formation components. More particularly, the computational solver solves for the formation volumes by inverting the mathematical model of block 207 and the tool response model of block 209, initializing a matrix of the formation volumes, predicting the component weight percentages using the inverted mathematical model of block 207 and the log measurements using the inverted tool response model of block 209, and examines the closeness of fit using a least squares minimization on the measured versus the predicted data. A misfit involves a new choice of formation volumes. This process is iterated until the measured and predicted data match within a pre-defined tolerance which signifies that the chosen formation volumes are the most probable combination. To be successful, these minimizations involve having the total number of log measurements of the tool response model of block 209 together with the constraints of the mathematical model of block 207 be more than or equal to the number of formation volumes solved for, and that the log measurements of the tool response model exhibit sensitivity to changes in these formation volumes. The computational solver can be realized by a general minimization solver.

In block 213, the mathematical model of block 207 (e.g., Eqn. (2)) is used to convert the volume fraction of the immature kerogen component at the given location as solved for in block 211 to a concentration (weight %) of immature kerogen at the given location in the formation.

In block 215, the mathematical model of block 207 (e.g., Eqn. (2) is used to convert the volume fraction of the fully mature kerogen (graphite) component at the given location as solved for in block 211 to a concentration (weight %) of fully mature kerogen (graphite) at the given location in the formation.

In block 217, the concentrations (weight % s) of immature and fully mature kerogen derived in blocks 213 and 215, respectively, are used to calculate concentration (weight %) of carbon, hydrogen and oxygen for the total kerogen (both immature and fully mature kerogen) at the given location in the formation. The concentration (weight %) of carbon is known as total organic carbon (TOC) of the total kerogen. TOC of the total kerogen can be computed by:

TOC(Wt % carbon in total kerogen)=(Wt % Immature Kerogen)*$C_{immature\ Kerogen}$(Wt % Mature Kerogen)*$C_{mature\ Kerogen}$  Eqn. (4)

where
Wt % Immature Kerogen is the weight percentage of the immature kerogen component output from block 213,
$C_{immature\ Kerogen}$ is the weight percentage of carbon in 100% immature kerogen component,
Wt % Mature Kerogen is the weight percentage of the fully mature kerogen component output from block 215, and
$C_{mature\ Kerogen}$ is the weight percentage of carbon in 100% fully mature kerogen component.

The values of $C_{immature\ Kerogen}$ for the four different immature kerogen types as well as the values of $C_{mature\ Kerogen}$ for the mature kerogen are provided in Table 1 above. Similar computations can be used to calculate concentration (weight %) of hydrogen and oxygen for the total kerogen. The values of $H_{immature\ Kerogen}$ and $O_{immature\ Kerogen}$ for the four different immature kerogen types as well as the value of $H_{mature\ Kerogen}$ and $O_{mature\ Kerogen}$ for the mature kerogen are provided in Table 1 above.

In block 219, the concentrations (weight %) of carbon, hydrogen and oxygen for the total kerogen (both immature and mature kerogen) from block 217 are used to derive atomic fraction (or gram-moles) of carbon, hydrogen and oxygen in the total kerogen in the given location of the formation. Such fractions (in gm-moles) can be calculated by:

$$C_{gm\text{-}moles}\ \text{kerogen} = \frac{\text{Wt \% Carbon in total kerogen (from block 217)}}{12.011} \quad \text{Eqn. (5a)}$$

$$H_{gm\text{-}moles}\ \text{kerogen} = \frac{\text{Wt \% Hydrogen in total kerogen (from block 217)}}{1.00797} \quad \text{Eqn. (5b)}$$

$$O_{gm\text{-}moles}\ \text{kerogen} = \frac{\text{Wt \% Oxygen in total kerogen (from block 217)}}{15.9994} \quad \text{Eqn. (5c)}$$

In block 221, the atomic fractions (or gram-moles) of carbon, hydrogen and oxygen in the total kerogen of block 219 are used to derive atomic ratios H/C and O/C for the total kerogen at the given location in the formation. Such atomic ratios can be calculated as:

$$\frac{H}{C}\text{kerogen} = \frac{H_{gm\text{-}moles}\ \text{kerogen (from block 219)}}{C_{gm\text{-}moles}\ \text{kerogen (from block 219)}} \quad \text{Eqn. (6a)}$$

$$\frac{O}{C}\text{kerogen} = \frac{O_{gm\text{-}moles}\ \text{kerogen (from block 219)}}{C_{gm\text{-}moles}\ \text{kerogen (from block 219)}} \quad \text{Eqn. (6b)}$$

Figure 3:
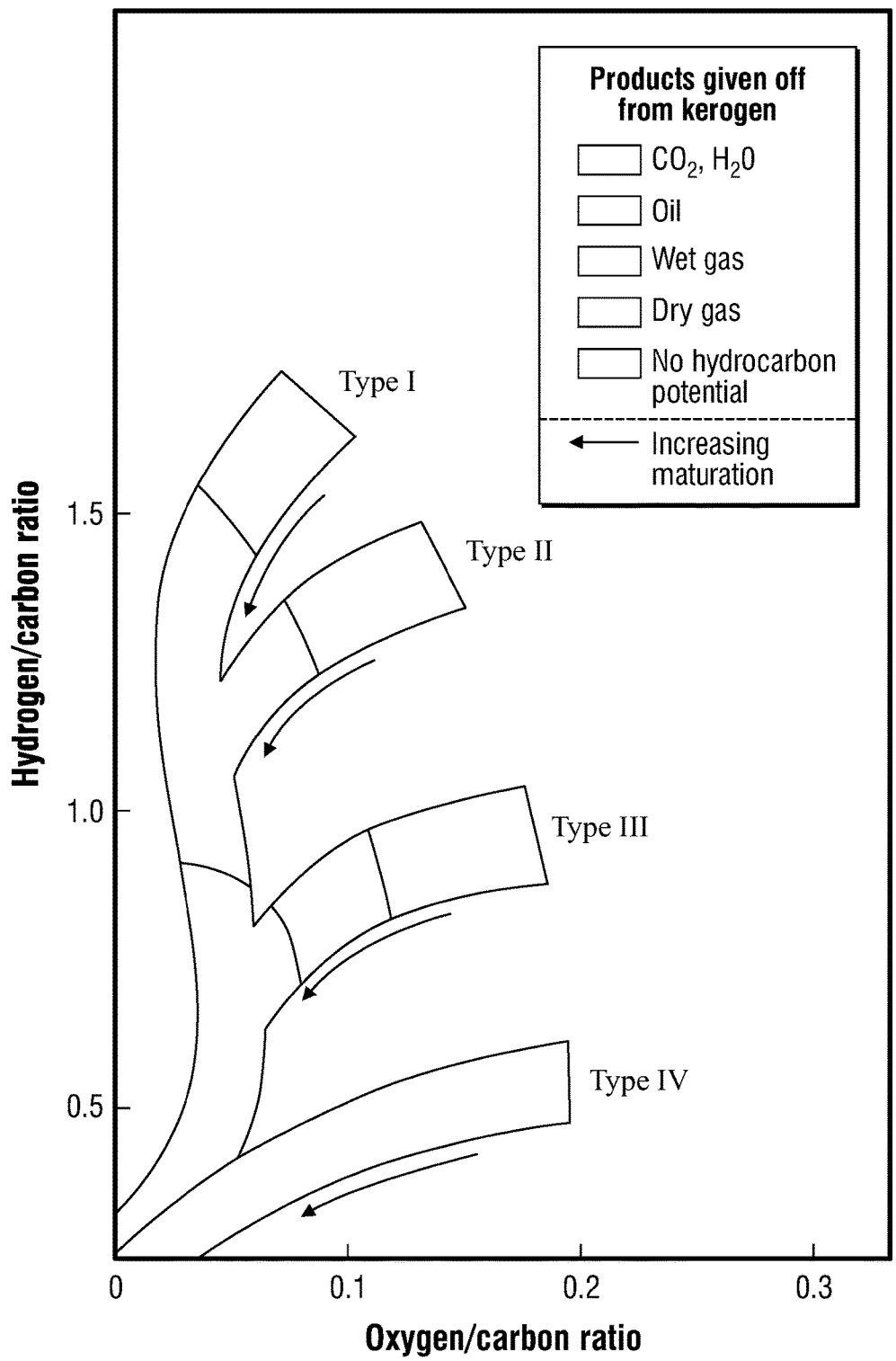
FIG. 3 is a Van-Krevelen diagram for use in conjunction with the data flow and process steps of FIGS. 2A-2D in accordance with certain embodiments of the present application.

In block 223, the atomic ratios H/C and O/C for the total kerogen at the given formation location of block 221 are used as indices into a Van-Krevelen diagram (FIG. 3). These indices point to a portion of the diagram corresponding to a particular kerogen type. This type should match the predominant kerogen type used in block 205.

In optional block 225, the TOC of block 217 as well as the atomic ratios H/C and O/C for the total kerogen of block 221 can be evaluated for consistency with the same properties measured by laboratory analysis of one or more core samples taken from the wellbore at or near the given location.

In block 227, the operations determine whether re-processing is desired and thus the TOC of block 217 as well as the atomic ratios H/C and O/C for the total kerogen of block 221 are accurate. If the check of block 227 fails, the operations continue to block 229 to return to block 205 for reprocessing. For example, during the reprocessing the predominant type of clay, carbonate and/or immature kerogen type can be reevaluated and changed if appropriate. In another example, the input response parameters for the equations of blocks 207 and/or 209 can be tuned based upon laboratory analysis. If the check of block 227 is successful, the operations continue to block 231.

In block 231, the disclosed algorithm uses the Van-Krevelen diagram (FIG. 3) in conjunction with the TOC of block 217 as well as the atomic ratios H/C and O/C for the total kerogen of block 221 to assess likely characteristics of the total kerogen at the given location in the formation (such as its propensity to generate gas-phase or liquid-phase hydrocarbons). For example, kerogen with H/C ratios greater than 1.00 may generate liquid hydrocarbons on pyrolysis, whereas those with lower atomic H/C ratios generate predominantly gaseous hydrocarbons. Principal generation of liquid hydrocarbons generally occurs when the TOC of the total kerogen is between 77 and 85%, and the atomic H/C ratio is above 0.80. Principal gas generation occurs between 85 and 89% carbon and between atomic H/C ratios of 0.40 and 0.80. Thus, principal gas generation occurs after principal oil generation. Actually, most kerogen has completed hydrocarbon generation when the carbon content reaches approximately 90% by weight and the atomic H/C ratio declines to 0.40. Kerogen with unusually high initial hydrogen contents undergoes principal oil generation up to 87% carbon and principal gas generation up to 92% carbon, but within the same atomic H/C ratio limits as normal oil-generating kerogen. Pennsylvanian-age coal, which is composed of gas-generating kerogen with a very low hydrogen content, has principal gas generation from 88 to 93% carbon.

In block 233, a polynomial expression can be used to relate the atomic ratios H/C and O/C for the total kerogen of block 221 to a kerogen type and a measure of maturity. The kerogen type and measure of maturity for the given formation location can be reported to the algorithm or to an analyst. In one embodiment, kerogen maturity can be derived from the centerline pathways of the four different types of kerogen in a Van-Krevelen diagram (FIG. 3). The degree of maturity can be taken as the distance the kerogen properties of H/C and O/C have traveled along these pathways. The origin is taken as 100% maturity, and the starting points of each relationship graphed is taken as 0% maturity. One can discretize either axis of the Van-Krevelen diagram such that the traveled length along the respective pathway can be computed geometrically, then subtracted from the total length and then divided by the total length of the pathway to compute a kerogen maturity value from 0-1. For example the total length of the vector for type 1 kerogen can be approximated by:

$$\text{Type 1 total length} = \sum_{x=0, y_i=0}^{x_i=0.07, y_i=1.75} \frac{(x_i - x_{i-1})}{\cos\left(\arctan\left(\frac{x_i - x_{i-1}}{y_i - y_{i-1}}\right)\right)} \quad \text{Eqn. (7)}$$

where xi and yi are incremented in suitably small increments (such as 0.005 for x) along each pathway.

The values of xi and yi are the locus of points defining the centerline pathway of the Type I kerogen of the Van-Krevelen diagram (FIG. 3) and are input into eqn. (7). The length of any point along the pathway would be performed by the same calculation but stopping at the location of where the data for that kerogen lies on the graph. Subtracting these two lengths gives the distance the kerogen species has matured or traveled along the pathway towards the origin representing 100% maturity. Dividing this by the total length gives the maturity as a percent. A similar calculation for Type II, III, and IV is performed using the locus of points representing their specific pathways. Some of the data points will not fall onto one of the pathways of the Van-Krevelen diagram of FIG. 3. For these points, a vector will be drawn from the data point normal to the line representing the pathway. The intersection of this normal line and the pathway defines the point to insert into the maturity index calculation. The larger the maturity index, the more gas prone the kerogen will be. The maturity index can also be compared directly to the values of vitrinite reflectance and/or thermal alternation index for interpretation.

In optional block 235, the operations perform additional analysis that characterizes properties of the formation. For example, total gas may be solved for. Normally, isotherms are used to determine the amount of the total gas that is adsorbed.

In block 237, the operations can return to block 205 to repeat the operations of blocks 205 to 235 for additional locations in the borehole. In this manner, the kerogen of the reservoir can be evaluated over multiple locations (e.g., depth intervals and/or lateral segments for horizontal boreholes) of the reservoir traversed by the borehole.

In order to provide a gauge as to the ability of the computational solver of block 211 to solve for the volume fractions of interest, the sensitivity of the measurements to the various volume fractions can be computed. This can be accomplished by taking the derivative of the measurement response equations such as the one shown in Eqn. (8) below. In this case, the partial derivative is defined by:

$$\text{if } z = f(x, y) \quad \text{Eqn. (8)}$$

$$dz = \left(\frac{\partial z}{\partial x}\right)_y dx + \left(\frac{\partial z}{\partial y}\right)_z dy \text{ where}$$

$dz$ = change of measurement to variables $x$ and $y$ $\left(\frac{\partial z}{\partial x}\right)_y$ = response of measurement to unit change of variable $x$ while variable $y$ is held constant $dx$ = change of $x$ Applying this to the bulk density measurement illustrated in Eqn. (3) gives:

$$d(\rho_b) = \left(\frac{\partial(\rho_i)}{\partial(V_i)}\right) d(V_i) + \left(\frac{\partial(\rho_i)}{\partial(V_{i+1})}\right) d(V_{i+1}) + \ldots \quad \text{Eqn. (9)}$$

where $d(\rho_b)$ = sensitivity of density measurement to formation volumes $\left(\frac{\partial(\rho_i)}{\partial(V_i)}\right)$ = sensitivity of density measurement to unit change of formation volume $i$ $d(V_i)$ = volume of component $i$ in formation The analysis of Eqn. (9) can extended for the equations of the tool response model to determine whether the log measurements will be able to be used to solve for the volume fractions for the formation components of interest. The results are tabulated in Table 3. Typical volume fractions of the formation were used in the analysis as noted in the table. A wide range of volume fractions are considered, meant to encompass the expected volumes to be encountered in the various shale-hydrocarbon basins of the world. For example we know the Marcellus is silicastic in nature while the Fayetteville is more calcareous prone. Therefore large volumes of both quartz and calcite are considered in Table 3 even though in one basin, one of the volumes may be non-existent. Blank spaces in Table 3 indicate that the formation volume does not contribute to the measurement response in a meaningful way.

TABLE 3

Measurement Response Sensitivity to Constituent Formation Volume Fractions

| Measurement | dry clay (illite, smectite chlorite, kaolinite) | bound water | Pyrite | silica | carbonate material (calcite, dolomite, siderite, ankerite) | free water | Gaseous hydrocarbons (for example, methane) | Oil (for example, decane) | immature kerogen, (type I, type II, type III, type IV) | graphite (fully mature kerogen) |
|---|---|---|---|---|---|---|---|---|---|---|
| Hydrogen index | High | High | | | | | | High | High | |
| Sigma (CU) | Med | Med | | | | High | | | | |
| Total Natural GR | High | | | | | | | | High | High |
| Natural gamma ray (Th) (ppm) | High | | | | | | | | | |
| Natural gamma ray (U) (ppm) | | | | | | | | | High | High |

TABLE 3-continued

Measurement Response Sensitivity to Constituent Formation Volume Fractions

| Measurement | dry clay (illite, smectite chlorite, kaolinite) | bound water | Pyrite | silica | carbonate material (calcite, dolomite, siderite, ankerite) | free water | Gaseous hydrocarbons (for example, methane) | Oil (for example, decane) | immature kerogen, (type I, type II, type III, type IV) | graphite (fully mature kerogen) |
|---|---|---|---|---|---|---|---|---|---|---|
| Natural gamma ray (K) (Wt %) | Med | | | | | | | | | |
| Conductivity (siemens) | | Med | | | | Med | | | | High |
| Bulk density (gm/cc) | High | | High | High | High | | | | | High |
| Photoelectric (barns/electron) | | | High | High | | | | | | |
| Thermal Neutron measurement (PU) | Med | High | | | | High | | High | Med | |
| Acoustic compression (us/ft) | | Med | | | | Med | High | Med | | |
| Nuclear Magnetic Resonance Porosity (PU) | | High | | | | High | | High | | |
| Iron wt % | | | High | | | | | | | |
| Sulfur wt % | | | High | | | | | | | |
| Aluminum wt % | High | | | | | | | | | |
| Chlorine wt % | | Med | | | | High | | | | |
| Silicon wt % | Med | | | High | | | | | | |
| Calcium wt % | | | | | High for calcite | | | | | |
| Magnesium wt % | | | | | High for dolomite | | | | | |
| Hydrogen wt % from inelastic spectroscopy | | | | | | | High | | | |
| Carbon wt % from inelastic spectroscopy | | | | | | | High | High | High | High |
| Oxygen wt % from inelastic spectroscopy | High | High | | High | High | High | | | | |

In an alternate embodiment, the concentrations of carbon, oxygen, and hydrogen provided by inelastic neutron scattering may not be present for the analysis. In this case, other log measurements can be used to determine the volume fractions for the immature kerogen component and the fully mature kerogen component. Therefore, direct measurements of H, C, and O from inelastic neutron scattering may not be used.

In yet another embodiment, there may be instances when one or more of the kerogen components may be ignored. For example, if the oxygen concentration (weight percent) or volume fractions volumes are ignored and the kerogen type is known to be Type I, the y axis of the Van-Krevelen diagram itself can be interpreted as the indicator of kerogen maturity and the propensity of the kerogen to generate oil or gas. This is because the trend line for the Type I kerogen is predominately vertical (FIG. 3). In other words, if the x axis (e.g., oxygen/carbon ratio) of the Van-Krevelen diagram is not available, the y axis (e.g., hydrogen/carbon ratio) alone may be used to estimate the kerogen maturity because of the generally vertical trend of Type I kerogen.

In yet another embodiment, the concentration of carbon by inelastic neutron scattering may be absent. In this case, it can be assumed to be a constant value for a given kerogen type, knowing that the majority of the change in the hydrogen/carbon ratio is the reduction of the hydrogen content as the kerogen matures. The hydrogen measurement may come from the inelastic hydrogen measurement or from the hydrogen index measurement. It is also possible to use the thermal neutron measurement itself.

In still another embodiment, polynomial expressions for the certain types of kerogen (such as the Type II and Type III kerogen of FIG. 3) can be included into the equations solved by the computational solver itself to determine the volume of total kerogen in the formation without the need to determine two separate volume fractions for immature and mature kerogen.

In yet another embodiment, there may be insufficient measurements to solve for the volume fractions of the two distinct immature and mature kerogen components. In this case, the measured dry weight percent measurements of carbon and hydrogen can be used to compute the H/C ratio. The inorganic sources of hydrogen are subtracted from the total measured hydrogen index. The remainder is the hydrogen associated with the organic kerogen. A similar calculation can be performed with the hydrogen dry weight percentage if available. The same calculation is then performed with the carbon dry weight percentage measurement. The hydrogen index, hydrogen and carbon dry weight percentage is converted to gm-moles of each and used to compute the H/C ratio and used to interpret the kerogen maturity for a given kerogen type.

In still another embodiment, lab measurements (such as lab measurements of concentrations of carbon, hydrogen and oxygen concentrations of core samples obtained from the formation) can be used in place of (or in addition to) the log measurements of such concentrations.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of characterizing a subterranean shale formation, comprising:
    operating a downhole tool in a borehole of the subterranean shale formation;
    measuring first data indicative of petrophysical properties of the subterranean shale formation at a given location in the subterranean shale formation in real time using the downhole tool, wherein the first data includes a hydrogen index at the given location in the subterranean shale formation;
    correlating, via a data processing system, the first data to second data via a response model associated with the petrophysical properties of the subterranean shale formation, wherein the second data is indicative of volume fractions for a set of formation components at the given location in the subterranean shale formation, wherein the set of formation components includes a number of mineral components and a number of hydrocarbon-bearing components, and wherein the hydrocarbon-bearing components include an immature kerogen component and a fully mature kerogen component;
    measuring third data indicative of a concentration of chemical elements present at the given location in the subterranean shale formation using the downhole tool, wherein the chemical elements include at least one of hydrogen, carbon, and oxygen;
    determining fourth data indicative of a concentration of the set of formation components at the given location in the subterranean shale formation based on the concentration of the chemical elements;
    generating, via the data processing system, a mathematical model that relates the concentration of the set of formation components at the given location in the subterranean shale formation to the volume fractions for the set of formation components based on a selected bulk density of the set of formation components;
    determining the second data based on analysis of the response model, the mathematical model, and the first data, wherein the second data comprises a volume fraction of the immature kerogen component and a volume fraction of the fully mature kerogen component;
    determining a first ratio indicative of a hydrogen content relative to a carbon content for total kerogen at the given location in the subterranean shale formation based on the second data, wherein the total kerogen includes the immature kerogen component and the fully mature kerogen component;
    determining a second ratio indicative of an oxygen content relative to a carbon content for the total kerogen at the given location in the subterranean shale formation based on the second data; and
    determining characteristics of the total kerogen at the given location in the subterranean shale formation via analysis of the first ratio and the second ratio.

2. The method according to claim 1, further comprising:
    determining a kerogen type of the total kerogen and a maturity level for the total kerogen at the given location in the subterranean shale formation based on analysis of the first ratio and the second ratio in conjunction with a Van-Krevelen diagram.

3. The method according to claim 2, further comprising:
    determining a propensity of the total kerogen to generate gas-phase hydrocarbons or liquid-phase hydrocarbons based on the analysis of the first ratio and the second ratio in conjunction with the Van-Krevelen diagram.

4. The method according to claim 1, further comprising:
    determining a maturity level for the total kerogen based on analysis of the first ratio and the second ratio in conjunction with a polynomial expression representing a respective pathway along a Van-Krevelen diagram.

5. The method according to claim 4, wherein the polynomial expression is represented in a discretized form.

6. The method according to claim 1, wherein
    the first ratio and the second ratio are derived from a calculation of total organic carbon of the total kerogen at the given location in the subterranean shale formation, wherein the calculation of total organic carbon is based on analysis of the mathematical model and the second data.

7. The method according to claim 1, wherein the downhole tool comprises:
    a gamma-ray spectroscopy tool configured to measure the third data.

8. The method according to claim 7, wherein the gamma-ray spectroscopy tool employs inelastic neutron scattering to measure the third data.

9. The method according to claim 1, wherein the mathematical model relates concentrations of the set of formation components to volume fractions for the set of formation components based upon bulk density of individual formation components of the set of formation components, bulk density of a mixture of individual formation components, and concentrations of the individual formation components.

10. A method of characterizing a subterranean shale formation, comprising:
    operating a downhole tool in a borehole of the subterranean shale formation;
    measuring first data indicative of petrophysical properties of the subterranean shale formation at a given location in the subterranean shale formation in real time using the downhole tool, wherein the first data includes a hydrogen index at the given location in the shale formation;
    correlating, via a data processing system, the first data to second data via a response model associated with the petrophysical properties of the subterranean shale formation, wherein the second data is indicative of volume fractions for a set of formation components at the given location in the subterranean shale formation, wherein the set of formation components includes a number of mineral components and a number of hydrocarbon-bearing components, and wherein the hydrocarbon-bearing components including at least one kerogen component;

measuring third data indicative of a concentration of chemical elements present at the given location in the subterranean shale formation using the downhole tool, wherein the chemical elements include at least one of hydrogen, carbon, and oxygen;

determining fourth data indicative of a concentration of the set of formation components at the given location in the subterranean shale formation based on the concentration of the chemical elements;

generating, via the data processing system, a mathematical model that relates the concentration of the set of formation components at the given location in the subterranean shale formation to the volume fractions for the set of formation components based on a selected bulk density of the set of formation components;

determining the second data based on analysis of the response model, the mathematical model, and the first data; and determining at least one ratio indicative of a maturity of kerogen at the given location in the subterranean shale formation based on the second data.

11. The method according to claim 10, further comprising:
determining the maturity for the kerogen at the given location in the subterranean shale formation based on analysis of the at least one ratio in conjunction with a Van-Krevelen diagram.

12. The method according to claim 11, further comprising:
determining a propensity of the kerogen at the given location in the subterranean shale formation to generate gas-phase hydrocarbons or liquid-phase hydrocarbons based on the analysis of the at least one ratio in conjunction with the Van-Krevelen diagram.

13. The method according to claim 10, further comprising:
determining the maturity for the kerogen at the given location in the subterranean shale formation based on analysis of the at least one ratio in conjunction with a polynomial expression representing a pathway along a Van-Krevelen diagram.

14. The method according to claim 13, wherein the polynomial expression is represented in a discretized form.

15. The method according to claim 10, wherein the downhole tool comprises a gamma-ray spectroscopy tool that employs inelastic neutron scattering to measure the third data, wherein the third data comprises at least two of hydrogen, carbon, and oxygen.

* * * * *